US010229219B2

(12) United States Patent
Owens et al.

(10) Patent No.: US 10,229,219 B2
(45) Date of Patent: Mar. 12, 2019

(54) SYSTEMS AND METHODS FOR DEMOTION OF CONTENT ITEMS IN A FEED

(71) Applicant: Facebook, Inc., Menlo Park, CA (US)

(72) Inventors: Erich James Owens, Oakland, CA (US); Varun Kacholia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 486 days.

(21) Appl. No.: 14/702,199

(22) Filed: May 1, 2015

(65) Prior Publication Data

US 2016/0321260 A1 Nov. 3, 2016

(51) Int. Cl.
*G06F 17/30* (2006.01)

(52) U.S. Cl.
CPC .... *G06F 17/3089* (2013.01); *G06F 17/30867* (2013.01)

(58) Field of Classification Search
CPC ............. G06F 17/3089; G06F 17/30867
USPC ...................................................... 707/726
See application file for complete search history.

(56) References Cited

U.S. PATENT DOCUMENTS

| | | | | | |
|---|---|---|---|---|---|
| 5,911,043 | A * | 6/1999 | Duffy | ........... | G06F 17/30867 707/E17.109 |
| 7,333,655 | B1 * | 2/2008 | Swift | ........... | G06K 9/00664 382/165 |
| 7,523,138 | B2 * | 4/2009 | Gruhl | ........... | G06Q 10/00 |
| 7,979,369 | B2 * | 7/2011 | Grenier | ........... | G06F 17/30705 382/224 |
| 8,065,199 | B2 * | 11/2011 | Dumon | ........... | G06F 17/30979 705/26.7 |
| 8,082,288 | B1 * | 12/2011 | Yeh | ........... | G06F 17/30864 707/723 |
| 8,086,491 | B1 * | 12/2011 | Matz | ........... | G06Q 30/02 705/14.49 |
| 8,229,914 | B2 * | 7/2012 | Ramer | ........... | G06F 17/30905 707/709 |
| 8,280,871 | B2 * | 10/2012 | Parikh | ........... | G06F 17/30867 707/708 |
| 8,346,878 | B2 * | 1/2013 | Bhogal | ........... | G06Q 10/107 709/206 |
| 8,438,224 | B1 * | 5/2013 | Chirita | ........... | G06Q 30/0231 709/203 |
| 8,495,003 | B2 * | 7/2013 | Nista | ........... | G06F 17/30867 706/62 |

(Continued)

OTHER PUBLICATIONS

Radulescu et al., "Identification of Spam Comments using Natural Language Processing Techniques", 2014 IEEE International Conference on Intelligent Computer Communication and Processing (ICCP), Sep. 4-6, 2014, pp. 29-35. (Year: 2014).*

(Continued)

*Primary Examiner* — Phuong Thao Cao
(74) *Attorney, Agent, or Firm* — Sheppard Mullin Richter & Hampton LLP

(57) ABSTRACT

Systems, methods, and non-transitory computer readable media configured to determine a value associated with at least one signal indicative of objectionable material in a content item. The value associated with the at least one signal indicative of objectionable material can be compared with a threshold value associated with the at least one signal. A demotion value can be determined in response to satisfaction of the threshold value associated with the at least one signal.

14 Claims, 7 Drawing Sheets

(56) References Cited

U.S. PATENT DOCUMENTS

| | | | | |
|---|---|---|---|---|
| 8,612,436 B1* | 12/2013 | Grundman | G06F 17/3053 | 707/735 |
| 8,695,100 B1* | 4/2014 | Cosoi | G06F 21/554 | 713/187 |
| 8,788,490 B1* | 7/2014 | Chatra | G06F 17/3087 | 707/726 |
| 8,831,953 B2* | 9/2014 | Vanjani | G10L 15/183 | 704/1 |
| 8,843,477 B1* | 9/2014 | Tirumalareddy | G06F 17/30 | 707/706 |
| 8,959,093 B1* | 2/2015 | Nerurkar | G06F 17/30867 | 707/706 |
| 8,972,388 B1* | 3/2015 | Finkelstein | G06F 3/0237 | 707/723 |
| 9,092,489 B1* | 7/2015 | Dasilva | G06F 17/3082 | |
| 9,292,868 B2* | 3/2016 | Sundaresan | G06F 17/30867 | |
| 9,325,653 B1* | 4/2016 | Peterson | H04L 51/24 | |
| 2001/0044818 A1* | 11/2001 | Liang | G06F 17/30867 | 709/201 |
| 2002/0116629 A1* | 8/2002 | Bantz | G06Q 30/02 | 726/26 |
| 2002/0116641 A1* | 8/2002 | Mastrianni | G06Q 10/107 | 726/11 |
| 2005/0160258 A1* | 7/2005 | O'Shea | G06K 9/00664 | 713/154 |
| 2005/0251399 A1* | 11/2005 | Agarwal | G06F 17/30867 | 705/1.1 |
| 2008/0021981 A1* | 1/2008 | Kumar | G06F 17/30864 | 709/219 |
| 2008/0028294 A1* | 1/2008 | Sell | G06F 17/30265 | 715/234 |
| 2008/0082381 A1* | 4/2008 | Muller | G06Q 10/10 | 705/344 |
| 2008/0134282 A1* | 6/2008 | Fridman | G06Q 10/10 | 726/1 |
| 2008/0162265 A1* | 7/2008 | Sundaresan | G06F 17/30867 | 707/781 |
| 2008/0172412 A1* | 7/2008 | Gruhl | G06Q 10/00 | |
| 2008/0301281 A1* | 12/2008 | Wang | G06F 21/56 | 709/224 |
| 2008/0307053 A1* | 12/2008 | Mitnick | G06F 17/30241 | 709/205 |
| 2009/0177670 A1* | 7/2009 | Grenier | G06F 17/30867 | |
| 2009/0313546 A1* | 12/2009 | Katpelly | H04N 7/17318 | 715/723 |
| 2009/0327849 A1* | 12/2009 | Kavanagh | G06Q 10/107 | 715/205 |
| 2010/0161384 A1* | 6/2010 | Wells | G06Q 30/00 | 705/59 |
| 2010/0162093 A1* | 6/2010 | Cierniak | G06F 17/30864 | 715/205 |
| 2010/0211514 A1* | 8/2010 | Sundaresan | G06F 17/30867 | 705/319 |
| 2010/0316300 A1* | 12/2010 | Epshtein | G06F 17/3089 | 382/229 |
| 2011/0106634 A1* | 5/2011 | Luttrell, Jr. | G06Q 30/02 | 705/14.73 |
| 2011/0125844 A1* | 5/2011 | Collier | H04L 12/00 | 709/204 |
| 2011/0178995 A1* | 7/2011 | Suchter | G06F 17/30864 | 707/692 |
| 2011/0191417 A1* | 8/2011 | Rathod | G06Q 30/02 | 709/204 |
| 2011/0213839 A1* | 9/2011 | Sundaresan | G06F 17/30867 | 709/204 |
| 2011/0295716 A1* | 12/2011 | Dumon | G06F 17/30979 | 705/26.61 |
| 2011/0302123 A1* | 12/2011 | Nista | G06F 17/30867 | 706/52 |
| 2012/0054466 A1* | 3/2012 | Devendran | G06F 12/10 | 711/207 |
| 2012/0079400 A1* | 3/2012 | Nauerz | G06T 11/206 | 715/762 |
| 2012/0131013 A1* | 5/2012 | Hobbs | G06F 17/30864 | 707/748 |
| 2012/0150850 A1* | 6/2012 | Parthasarathy | G06F 17/30867 | 707/728 |
| 2012/0215861 A1* | 8/2012 | Smith | H04L 51/12 | 709/206 |
| 2013/0018965 A1* | 1/2013 | Ramachandran | G06Q 10/107 | 709/206 |
| 2013/0041901 A1* | 2/2013 | Nikankin | G06F 17/3089 | 707/737 |
| 2013/0198196 A1* | 8/2013 | Myslinski | G06F 17/30023 | 707/740 |
| 2013/0318099 A1* | 11/2013 | Sano | G06F 17/30017 | 707/748 |
| 2013/0332386 A1* | 12/2013 | Billmaier | G06Q 30/02 | 705/347 |
| 2013/0340089 A1* | 12/2013 | Steinberg | H04L 63/10 | 726/27 |
| 2014/0013241 A1* | 1/2014 | Brown | G06Q 30/02 | 715/753 |
| 2014/0046753 A1* | 2/2014 | Rabii | G06Q 30/0269 | 705/14.41 |
| 2014/0172989 A1* | 6/2014 | Rubinstein | H04L 51/32 | 709/206 |
| 2014/0200893 A1* | 7/2014 | Vanjani | G10L 15/183 | 704/257 |
| 2014/0280084 A1* | 9/2014 | Dulitz | G06F 17/30489 | 707/723 |
| 2014/0288997 A1* | 9/2014 | Schultz | G06Q 10/0635 | 705/7.28 |
| 2014/0317142 A1* | 10/2014 | Naidu | G06F 17/30542 | 707/780 |
| 2014/0351957 A1* | 11/2014 | Zacher | G06F 17/30867 | 726/29 |
| 2015/0039293 A1* | 2/2015 | Viswanathan | G06F 17/277 | 704/9 |
| 2015/0088897 A1* | 3/2015 | Sherman | G06Q 10/00 | 707/740 |
| 2015/0143294 A1* | 5/2015 | Piccinato | G06F 3/0482 | 715/817 |
| 2015/0161128 A1* | 6/2015 | Goel | G06F 17/3087 | 707/726 |
| 2015/0195295 A1* | 7/2015 | Sandler | G06Q 30/0203 | 726/26 |
| 2015/0248736 A1* | 9/2015 | Myslinski | G06Q 10/06 | 705/319 |
| 2015/0317400 A1* | 11/2015 | Charkov | G06F 17/30867 | 707/724 |
| 2015/0326606 A1* | 11/2015 | Chen | G06F 17/30864 | 726/23 |
| 2015/0348329 A1* | 12/2015 | Carre | G06Q 30/02 | 345/633 |
| 2016/0036756 A1* | 2/2016 | Jorgenson | H04L 51/32 | 709/206 |
| 2016/0162576 A1* | 6/2016 | Arino de la Rubia | G06F 17/2765 | 707/739 |
| 2016/0239493 A1* | 8/2016 | Stroganov | G06Q 50/01 | |
| 2016/0321260 A1* | 11/2016 | Owens | G06F 17/30867 | |

OTHER PUBLICATIONS

Wang et al., "Using Inter-Comment Similarity of Comment Spam Detection in Chinese Blogs", 2011 International Conference on Advances in Social Networks Analysis and Mining, 2011, pp. 189-194 (Year: 2011).*

Yadav et al., "An Approach for Offensive Text Detection and Prevention in Social Networks", IEEE Sponsored 2nd International Conference on Innovations in Information Embedded and Communication Systems (ICIIECS' 15), 2015, 4 pages. (Year: 2015).*

Bian et al., "A Few Bad Votes Too Many? Toward Robust Ranking in Social Media", in Proceedings of the 4th International Workshop

(56) References Cited

OTHER PUBLICATIONS on Adversarial Information Retrieval on the Web, Apr. 22, 2008, Beijing, China, pp. 53-60. (Year: 2008).*
Marmol et al., "Reporting Offensive Content in Social Networks: Toward a Reputation-Based Assessment Approach", IEEE Internet Computing, vol. 18, Issue 2, Mar.-Apr. 2014, pp. 32-40. (Year: 2014).*
Zhang et al., "Propagating Both Trust and Distrust with Target Differentiation for Combating Link-Based Web Spam", ACM Transactions on the Web, vol. 8, No. 3, Article 15: pp. 1-33, Jun. 2014. (Year: 2014).*
Kafka, Peter, "Facebook Says It Will Weed Out Fake News—But Leave the Onion Alone," Re/code, Vox Media, Inc., Jan. 20, 2015 [retrieved online at http://recode.net/2015/01/20/facebook-says-it-will-weed-out-fake-news-but-leave-the-onion-alone/].
Welch, Chris, "Facebook Wants to Kill the Bogus Stories and Scams Clogging Up Your News Feed," The Verge, Vox Media, Inc., Jan. 20, 2015 [retrieved online at http://www.theverge.com/2015/1/20/7859457/facebook-wants-to-kill-hoax-news-feed-posts].
Albergotti, Reed, "Facebook Tries to Block 'Hoaxes' from the News Feed," The Wall Street Journal, Dow Jones & Company, Inc., Jan. 20, 2015 [retrieved online at http://blogs.wsj.com/digits/2015/01/20/facebook-tries-to-block-hoaxes-from-the-news-feed/].

* cited by examiner

SYSTEMS AND METHODS FOR DEMOTION OF CONTENT ITEMS IN A FEED

FIELD OF THE INVENTION

The present technology relates to the field of content provision. More particularly, the present technology relates to techniques for downranking objectionable content for a feed.

BACKGROUND

Today, people often utilize computing devices for a wide variety of purposes. Users can use their computing devices, for example, to communicate and otherwise interact with other users. Such interactions are increasingly popular over a social network.

Some interactions in a social network may include the sharing of content. Content can be shared in a variety of manners. One example of a technique to share content with a user in a social network is a news feed. The news feed can be a sequential listing of content items (or stories) that are deemed appropriate for presentation to the user. The news feed for the user can include myriad types of content items. Such content items can include, for example, images uploaded by others in the social network of the user, descriptions of activities of connections of the user, articles regarding subject matter of interest to the user, advertisements directed to the user, etc. The content items unfortunately also can include objectionable material that degrades user experience with the news feed and otherwise compromises the integrity of the social network.

SUMMARY

Various embodiments of the present disclosure can include systems, methods, and non-transitory computer readable media configured to determine a value associated with at least one signal indicative of objectionable material in a content item. The value associated with the at least one signal indicative of objectionable material can be compared with a threshold value associated with the at least one signal. A demotion value can be determined in response to satisfaction of the threshold value associated with the at least one signal.

In an embodiment, the at least one signal can include a domain signal relating to a number of links, provided by users in response to content items published by a domain, directing to websites that publish content to identify false information as false.

In an embodiment, the at least one signal can include a keyword signal relating to a number of responses, including one or more keywords indicative of objectionable material, to a content item.

In an embodiment, the at least one signal can include a reporting signal relating to a number of users who have reported an objection to the content item.

In an embodiment, a rank value associated with presentation of the content item in a news feed can be adjusted based on the demotion value.

In an embodiment, the adjustment of a rank value can comprise lowering the rank value.

In an embodiment, the determination of a demotion value can comprise assigning the demotion value in proportion to the value associated with the at least one signal indicative of objectionable material.

In an embodiment, the demotion value can be discounted for a user when the content item is associated with a domain to which the user is subscribed.

In an embodiment, the demotion value can be discounted when the content item contains one or more keywords that are indicative of objectionable material.

In an embodiment, a computing system for carrying out the various embodiments of the present disclosure can be controlled by a social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
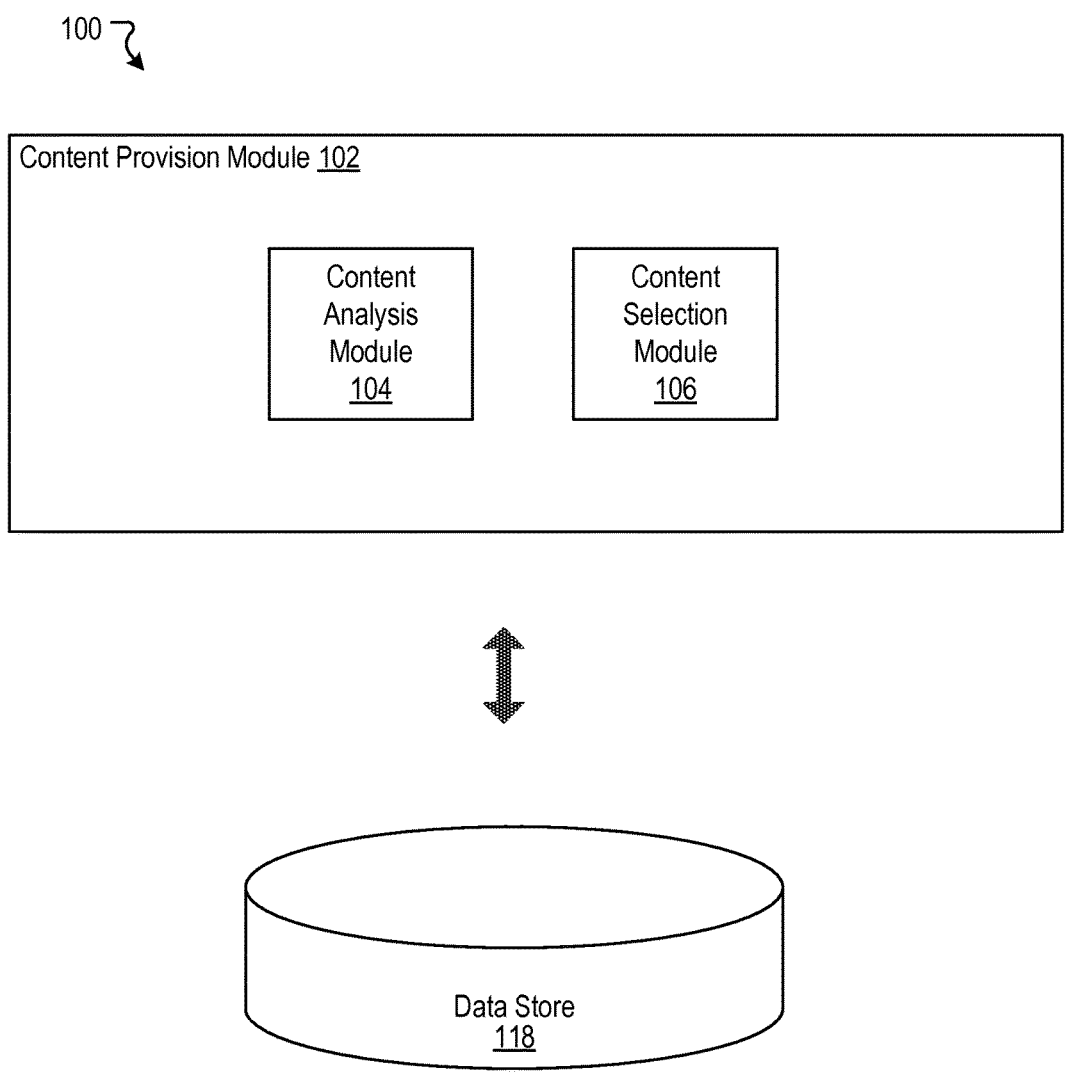
FIG. 1 illustrates a system including an example content provision module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Demoting Content Based on User Responses

A news feed can be an effective technique to present content items (or stories) to a user. In some instances, a news feed can constitute a time ordered listing of content items presented for the user to stay apprised of events in her social network. The news feed for the user can include various types of content items. The content items can include, for example, images uploaded by others in a social network of the user, accounts of activities of connections of the user, articles regarding subject matter of interest to the user, advertisements directed to the user, etc. In most situations, the content items presented to the user can be informative to the user insofar as they are accurate.

As a social network grows, the availability of content from which to select specific content items for presentation to a user also can grow. Unfortunately, the growth in content in a social network can often spur proliferation of spam and other types of objectionable material that is contrary to the spirit of informative and genuine communication within the social network. Such material can take the form of stories that contain false information to capture the attention of a user, raise the curiosity of the user, and lure the user into taking certain action that benefits a publisher associated with the material. An example of such user action is navigation to a website destination intended by the publisher, where additional false information in the form of elaboration may appear. If a user unwittingly finds the false information persuasive or compelling, the user may share the material within her social network, as desired by the publisher. Such user action can lead to the distribution of the material in the news feeds of her connections, further proliferating the false information. As a result, the illegitimate aims of the publisher are furthered at the expense of the social network.

An improved approach to providing content items in a news feed overcomes disadvantages associated with conventional approaches. In general, systems, methods, and computer readable media of the present disclosure can identify signals associated with a content item that are indicative of objectionable (or undesirable) material. One type of objectionable material includes misleading, inaccurate, or otherwise false information that provokes or encourages the user to navigate to a specified website where additional false information appears. For example, the signals indicative of objectionable material can include a domain signal relating to a number of links to websites that generally publish content to identify false information as false, the links provided in response to content items published by a domain associated with a publisher of the content items. As another example, the signals indicative of objectionable material can include a keyword signal relating to a number of keywords indicative of objectionable material that appear in response to a content item. Other signals indicative of objectionable material can also be used.

Based on one or more of the signals indicative of objectionable material, a content item that likely contains objectionable material can be identified. A demotion value can be generated that reflects the extent to which the content item likely contains objectionable material. After the content item is provided to a content selection technique to determine a rank value that determines the potential appearance of the content item in a news feed for presentation to a user, the rank value can be adjusted by the demotion value to accordingly down rank the content item relative to other content items for potential presentation to the user.

FIG. 1 illustrates an example system 100 including an example content provision module 102 to identify and redress content items (e.g., stories) having objectionable (or undesirable) material prior to proliferation of the content items, according to an embodiment of the present disclosure. One type of objectionable material includes misleading, inaccurate, or otherwise false information that attempts to capture the attention of a user through provocative misinformation contained in the content item and then lure the user to an intended website where additional false information is presented to the user. For example, objectionable material in a content item can include any one or more of a variety of false statements, such as "Famous rapper John Doe is giving away $1 million dollars", "The daughter of the president of the United States is pregnant", "Raisins cure the common cold", etc. A content item from which objectionable material can be identified by the content provision module 102 can include text, images, video, audio, or the like, and any combination thereof. In some embodiments, as discussed herein, the present disclosure can be used in connection with a news feed managed by a social networking system that delivers content items to a user of the social networking system. In other embodiments, the present disclosure can be used in connection with content delivery techniques other than a news feed.

The content provision module 102 can include a content analysis module 104 and a content selection module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provisions module 102 can be implemented in any suitable combinations.

The content analysis module 104 can analyze content items based on signals indicative of objectionable material in the content items. For example, the signals indicative of objectionable material can include a domain signal relating to a number of links to websites that identify the objectionable material as false, the links provided in response to content items published by a domain associated with a publisher of the content items. As another example, the signals indicative of objectionable material can include a keyword signal relating to a number of responses including one or more keywords indicative of objectionable material to a content item. Other signals indicative of objectionable material can also be used.

Based on one or more of the signals indicative of objectionable material, a content item that likely contains objectionable material can be identified. A demotion value can be generated that reflects the extent to which the content item likely contains objectionable material. The demotion value can be used to adjust a rank value of the content item for presentation in a news feed of a user, as determined by the content selection module 106. The rank value of the content item can be adjusted by the demotion value and the content item can be accordingly downranked in relation to other content items for potential presentation in the news feed. A resulting adjusted rank value of the content item can be used to determine whether to include the content item in the news feed of the user. The content analysis module 104 is discussed in more detail herein.

The content selection module 106 can determine a rank value associated with a content item to determine potential presentation of the content item in a news feed with the rank value adjusted by a demotion value determined by the content analysis module 104. In some embodiments, the content selection module 106 can be implemented as a news feed managed by a social networking system that can select content items (or stories) for presentation to a user. In one embodiment, the content selection module 106 can train (and retrain) machine learning models for ranking content items for potential presentation in news feeds of users of a social networking system. For example, the content selection module 106 can divide its users into different sets based on various attributes of the users (e.g., age, ethnicity, income, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them.

Features used to train the models can include interactions of users with content items of a news feed. Such interactions can include, for example, selecting a link in the content item, commenting on the content item, liking the content item, and hiding the content item. The content selection module 106 can use the models for each set of users to determine levels of interest of a user in topics reflected by content items. The level of interest of a user in each topic can be indicated by a topic score. The social networking system generate a rank value for a content item for potential presentation to a user based on a topic(s) reflected by the content item and the topic score(s) of the user for the topic(s). Content items having a rank value that satisfies a selected threshold value can be presented to the user in her news feed.

The rank value for the content item can be adjusted by the demotion value determined by the content analysis module 104. As discussed herein, the rank value can be adjusted in a variety of manners. For content items likely containing objectionable material, the rank value can be adjusted to a lower value. A resulting adjusted rank value can be generated for comparison with the selected threshold value to determine whether the content item will appear in the news feed of the user.

The data store 118 can be configured to store and maintain various types of data, such as the data relating to support of and operation of the content provision module 102. The data can include data relating to, for example, counters indicating a number of links to websites that generally publish content to identify false information as false with the links provided in response to content items published by a domain associated with a publisher of the content items, counters indicating a number of comments provided in response to a content item having keywords indicative of objectionable material, counters indicating a number of reports from users indicating that a content item is objectionable, threshold values associated with signals indicative of objectionable material that when satisfied suggest the presence of objectionable material, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the content provision module 102 can be configured to communicate and/or operate with the data store 118.

Figure 2:
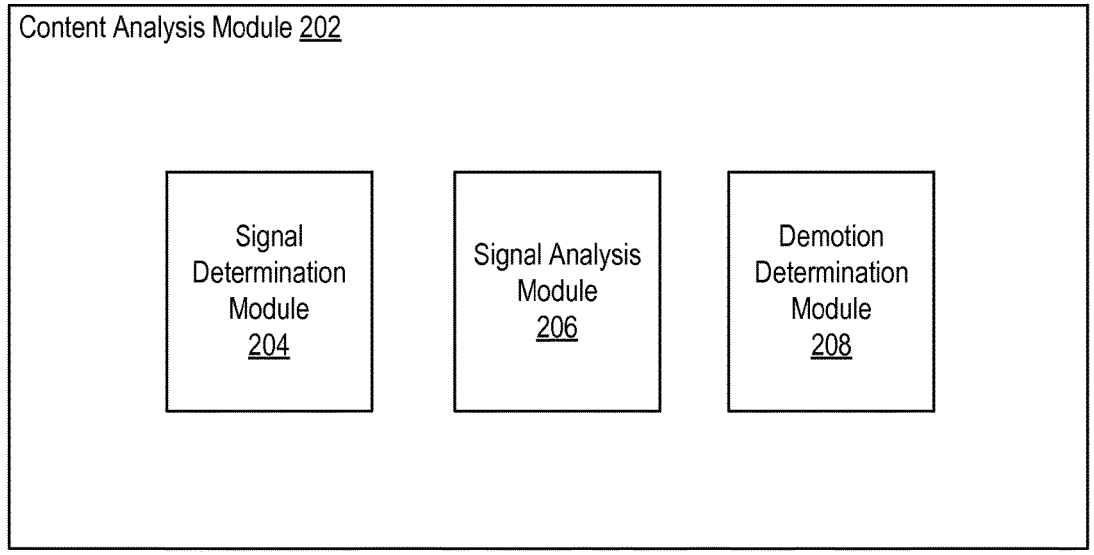
FIG. 2 illustrates an example content analysis module, according to an embodiment of the present disclosure.

FIG. 2 illustrates an example content analysis module 202, according to an embodiment of the present disclosure. In some embodiments, the content analysis module 104 of FIG. 1 can be implemented with the content analysis module 202. As shown in the example of FIG. 2, the content analysis module 202 can include a signal determination module 204, a signal analysis module 206, and a demotion determination module 208.

The signal determination module 204 can determine values of a plurality of signals indicative of objectionable material contained in (or otherwise related) to the content item. The signals can measure various types of contextual data to inform about the possible existence of objectionable material in a content item. One type of contextual data can include types and numbers of responses from users who have accessed the content item. One or more of the signals can be used to a probability that the content item contains objectionable material.

The signal determination module 204 can determine, for example, a value of a domain signal relating to a number of links provided by users in response to content items published by a domain associated with a publisher that contain the potentially objectionable material. The links can direct to websites that generally publish content to identify false information as false (or "hoax-busting" websites). The signal determination module 204 can monitor (e.g., through a suitable counter) over time a total number of links to hoax-busting websites that are provided by users in response to all content items published by the domain.

The signal determination module 204 also can determine, for example, a value of a keyword signal relating to a number of responses including one or more keywords indicative of objectionable material to a content item. The keywords can include various terms, such as "fake", "hoax", "scam", "fraud", and the like. The responses can include comments posted in response to the content item. The signal determination module 204 can monitor (e.g., through a suitable counter) a number of responses that contain one or more of the keywords. The keyword signal can apply to a content item that has been published in a social networking system in any of a variety of manners, including posts and global shares.

The keyword signal can be based on fuzzy clusters associated with content items. In this regard, the signal determination module 204 can process a plurality of content items that are deemed to be sufficiently similar (or identical) as one content item. For example, if a first content item and a second content item are determined to be similar within a threshold degree of similarity, the first content item and the second content item can be treated as a fuzzy cluster in relation to the keyword signal. As a result, a number of responses containing keywords indicative of objectionable material provided in response to the first content item and the second content item can be combined.

The signal determination module 204 also can determine values of other signals indicative of objectionable material. As one example, a value of a reporting signal can relate to a number of users who have reported an objection to a content item containing potentially objectionable material. As another example, a value of a deletion signal can relate to a number of users over time who have deleted a content item previously published by the users after subject matter reflected by the content item is addressed by one or more hoax-busting websites. As yet another example, a value of an administrator signal can relate to an assessment by an administrator of a social networking system regarding the probability that a content item contains objectionable material. It will be appreciated that other signals can be used.

The signal analysis module 206 can determine whether a rank value regarding presentation of a content item in a news feed should be adjusted based on values of the signals indicative of objectionable material. The signal analysis module 206 can compare the values of signals indicative of objectionable material with associated threshold values to determine whether a demotion value should be applied to the rank value. The signal analysis module 206 can determine threshold values associated with the signals based in whole or part on a machine learning process, an administrator of the social networking system, or any other suitable technique or entity.

The signal analysis module 206 can compare a value of a domain signal with a threshold value associated with the domain signal. In various embodiments, the threshold value can be a selected number of links to hoax-busting websites over a selected time period where the number of links to hoax-busting websites constitutes a selected percentage of a total number of links to all websites. The links can be provided in response to all content items associated with a domain. For example, with respect to the threshold value, the selected number of links to hoax-busting websites can be 500, the selected time period can be two weeks, and the selected percentage of a total number of links to all websites can be 10 percent. In another example, the selected number of links to hoax-busting websites can be any other suitable value (e.g., 100, 250, 1,323, etc.), the selected time period can be any other suitable value (one day, one week, one month, etc.), and the selected percentage of a total number of links to all websites can be any other suitable value (e.g., 1%, 4%, 8%, 25%, etc.). When a value of the domain signal satisfies the threshold value, the signal analysis module 206 can determine that a demotion value should adjust a rank value for each content item published by the domain.

The signal analysis module 206 can compare a value of a keyword signal with a threshold value associated with the keyword signal. In various embodiments, the threshold value can be a selected number of responses to a content item that contain one or more keywords. For example, with respect to the threshold value, the selected number of responses can be 100. In another example, the selected number of responses can be any other suitable value (e.g., 25, 43, 110, 250, etc.). When a value of the keyword signal associated with a content item satisfies the threshold value, the signal analysis module 206 can determine that a demotion value should adjust a rank value for the content item.

The signal analysis module 206 can compare a value of a reporting signal with a threshold value associated with the reporting signal. In various embodiments, the threshold value can be a selected number of reports by users who have notified a social networking system that a content item contains objectionable material. For example, the selected number of reports can be any suitable number. When a value of the reporting signal associated with a content item satisfies the threshold value, the signal analysis module 206 can determine that a demotion value should adjust a rank value for the content item.

The signal analysis module 206 in this manner can compare an associated threshold value with a value of each signal indicative of objectionable material. When the threshold value is satisfied, the signal analysis module 206 can determine that a demotion value should adjust a rank value for an associated content item(s). In some embodiments, the satisfaction of a threshold value associated with one signal can result in the determination that a demotion value should be generated.

In various embodiments, the satisfaction of threshold values associated with a plurality of signals in any desired combination can result in the determination that a demotion value should be generated. For example, the signal analysis module 206 can be configured to require the satisfaction of a threshold value associated with the domain signal, the satisfaction of a threshold value associated with the keyword signal, and the satisfaction of a threshold value associated with the reporting signal before determining that a demotion value should be generated for one or more content items. As another example, the signal analysis module 206 can be configured to require only the satisfaction of a threshold value associated with the keyword signal and the satisfaction of the reporting signal before determining that a demotion value should be generated for one or more content items.

The signal analysis module 206 can identify circumstances when the presence of signals indicative of objectionable material in a content item can be discounted or dismissed. When such discounting occurs, a demotion value based on a value of a signal indicative of objectionable material can be reduced. When such dismissal occurs, a demotion value based on a signal indicative of objectionable content can be set to a zero value. In various embodiments, when a user is subscribed to a domain that publishes content items, all content items published by the domain can receive a demotion value that is reduced to have a lower value or can receive a demotion value that is set to a zero value in connection with the user, even if the signals indicative of objectionable material otherwise suggest the presence of objectionable material in the content items. The signal analysis module 206 in this regard can prioritize an affirmative decision of a user to receive content items from a domain over any contrary determinations regarding the presence of objectionable material in content items from the domain. In various embodiments, when a content item contains keywords including terms, such as "fake", "hoax", "scam", "fraud", and the like, the content item can receive a demotion value that is reduced to have a lower value or can receive a demotion value that is set to a zero value in connection with any user, even if the signals indicative of objectionable material otherwise suggest the presence of objectionable material. The signal analysis module 206 in this regard can acknowledge that responses to a content item having one or more keywords can reflect legitimate discourse on subject matter reflected by the content item instead of signal objectionable material.

The demotion determination module 208 can determine a demotion value that can be used to adjust a rank value for a content item. The demotion value can be generated based on a value of the signal that has satisfied an associated threshold value. For example, the demotion value can be proportional to the magnitude of a value of a signal that has satisfied a threshold value associated with the signal. As another example, the demotion determination module 208 can provide a mapping between all possible values of a signal that has satisfied an associated threshold value with corresponding demotion values. The demotion value for a content item can reflect a confidence level (or probability) that the content item contains objectionable material.

The generated demotion value can be applied in a variety of manners to the rank value determined by the content selection module 106. In some embodiments, the demotion value can adjust the rank value to have a lower value. For example, the demotion value can be a percentage or fraction that can be multiplied with the rank value so that their product represents an adjusted rank value. In other embodiments, the demotion value can be applied to the rank value in other manners to generate an adjusted rank value.

In some embodiments, the demotion determination module 208 can cause a notice to be displayed on or adjacent to a content item when it is determined that the content item likely contains objectionable material. For example, the notice can be displayed in a conspicuous manner on the content item and indicate "Members of the community have reported that this contains misinformation" or similar warnings. In some embodiments, the notice can be displayed when a demotion value associated with the content item satisfies a threshold value or otherwise when a confidence level satisfies a threshold indicating a high probability that the content item contains objectionable material.

Figure 3:
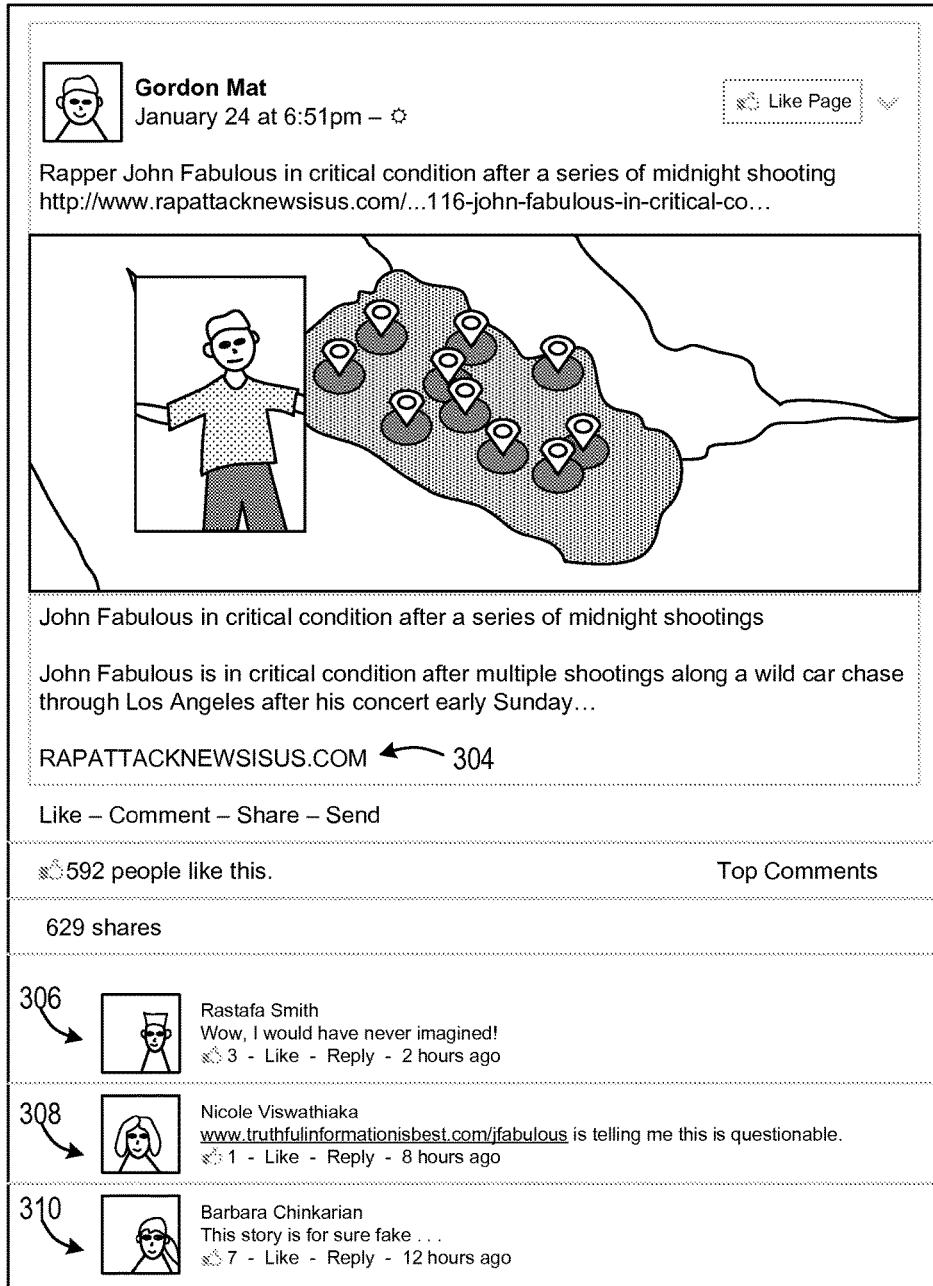
FIG. 3 illustrates an example user interface, according to an embodiment of the present disclosure.

FIG. 3 illustrates an example user interface 300 including a content item and responses thereto from users of a social networking system on which values of one or more signals indicative of objectionable material can be based, according to an embodiment of the present disclosure. The user interface 300 can be presented on a computing device associated with the user. The user interface 300 can be a user interface supported by a social networking system.

The user interface 300 can include a representation 302 of a content item. As shown, the content item is a story containing objectionable material in the form of false information. The content item can be published or otherwise made available by a domain 304 to users of the social networking system. As shown, the content item has been shared by a first user of the social networking system and, as a result, has appeared in a news feed of a second user of the social networking system.

The content item has prompted example responses 306, 308, 310 to the content item from various other users of the social networking system. The response 306 includes a comment that expresses a user's state of mind in relation to the content item. The response 308 includes a link directing users to a hoax-busting website that provides information indicating that the content item contains false information. The response 310 includes a user expression of disbelief and a keyword "fake". Other types of responses are possible.

The responses 306, 308, 310 can be analyzed by the content provision module 102. For example, the appearance of a link to a hoax-busting website in the response 308 can be detected. As a result, the content provision module 102 can increment a counter associated with a domain signal that can monitor a number of links directing to hoax-busting websites and provided by users in response to content items published by the domain 304. If the number of such links within a selected time period satisfies a threshold value associated with the domain signal, then a demotion value can be determined to adjust a rank value for content items published by the domain 304 in connection with their potential presentation in the news feeds of other users.

As another example, the appearance of the keyword "fake" in the response 310 can be detected. As a result, the content provision module 102 can increment a counter associated with a keyword signal that can monitor a number of responses, such as comments, to a content item that contain one or more keywords indicative of false information. If the number of such responses satisfies a threshold value associated with the keyword signal, then a demotion value can be determined to adjust a rank value for the appearance of the content item in news feeds of other users.

In some embodiments, other information can be provided in the user interface 300. For example, a report button (not shown) can be included in the user interface 300 to invite users to report false information in the content item, as appropriate. As a result, the content provision module 102 can increment a counter associated with a reporting signal that can monitor a number of objections to the content item. If the number of such objections satisfies a threshold value associated with the reporting signal, then a demotion value can be determined to adjust a rank value for the appearance of the content item in news feeds of other users. As another example, when the value of one or more signals indicative of objectionable material satisfies a notice threshold value, a notice (not shown) can appear in the user interface 300 to inform users that the content item may contain false information.

Figure 4:
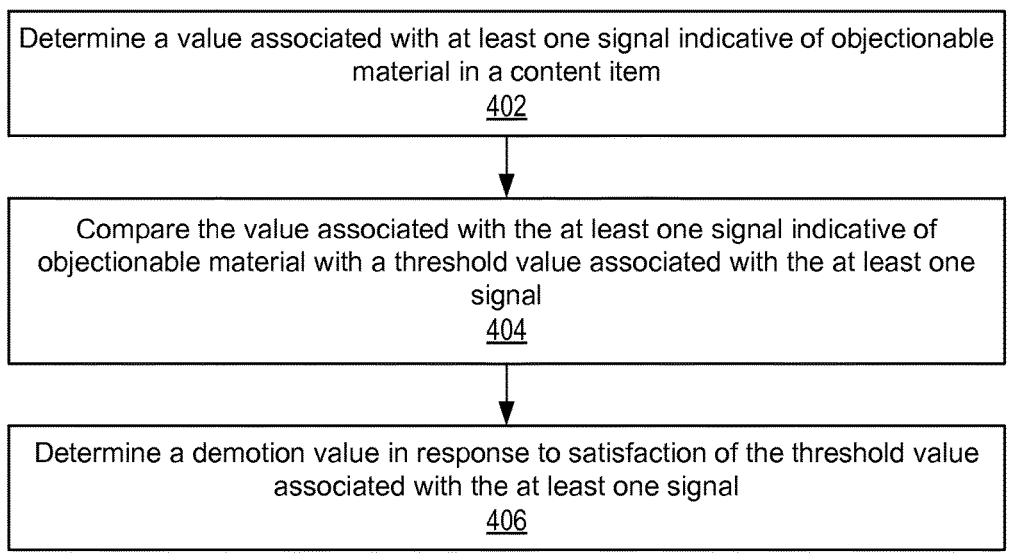
FIG. 4 illustrates an example method to determine a demotion value, according to an embodiment of the present disclosure.

FIG. 4 illustrates an example method 400 to determine a demotion value, according to an embodiment of the present disclosure. It should be appreciated that there can be additional, fewer, or alternative steps performed in similar or alternative orders, or in parallel, in accordance with the various embodiments discussed herein unless otherwise stated.

At block 402, the method 400 can determine a value associated with at least one signal indicative of objectionable material in a content item. At block 404, the method 400 can compare the value associated with the at least one signal indicative of objectionable material with a threshold value associated with the at least one signal. At block 406, the method 400 can determine a demotion value in response to satisfaction of the threshold value associated with the at least one signal. Other suitable techniques that incorporate various features and embodiments of the present disclosure are possible.

Figure 5:
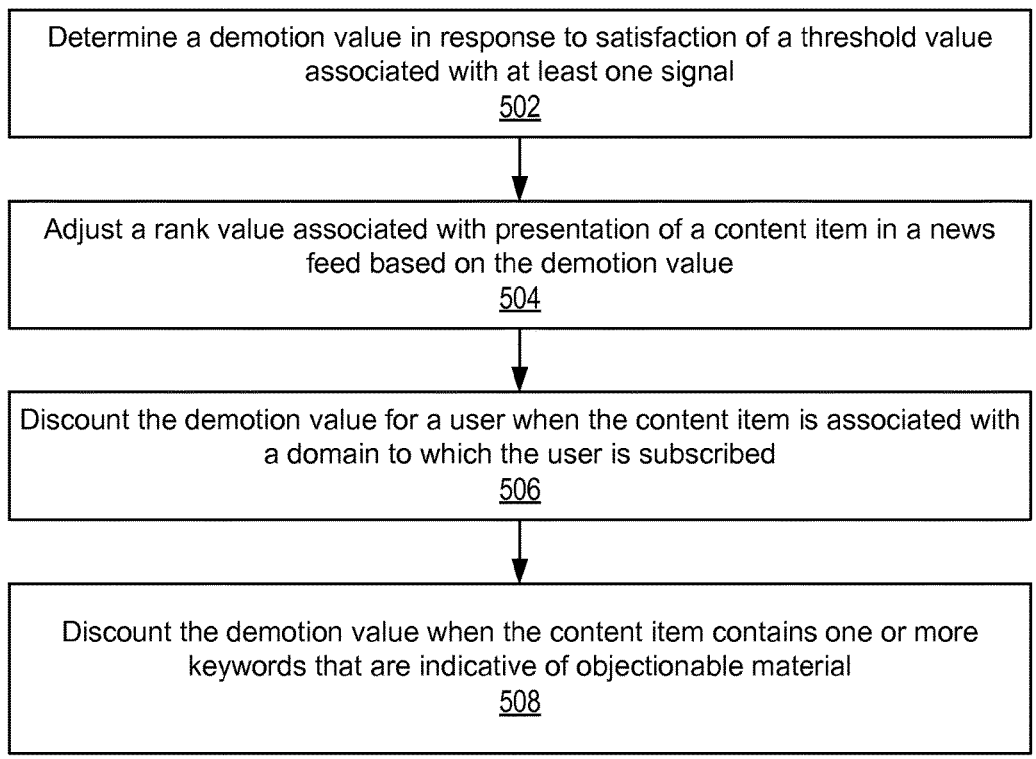
FIG. 5 illustrates an example method to selectively apply a demotion value, according to an embodiment of the present disclosure.

FIG. 5 illustrates an example method 500 to selectively apply a demotion value, according to an embodiment of the present disclosure. It should be appreciated that there can be additional, fewer, or alternative steps performed in similar or alternative orders, or in parallel, in accordance with the various embodiments discussed herein unless otherwise stated.

At block 502, the method 500 can determine a demotion value in response to satisfaction of a threshold value associated with at least one signal. At block 504, the method 500 can adjust a rank value associated with presentation of a content item in a news feed based on the demotion value. At block 506, the method 500 can discount the demotion value for a user when the content item is associated with a domain to which the user is subscribed. At block 508, the method 500 can discount the demotion value when the content item contains one or more keywords that are indicative of objectionable material. Other suitable techniques that incorporate various features and embodiments of the present disclosure are possible.

Social Networking System—Example Implementation

Figure 6:
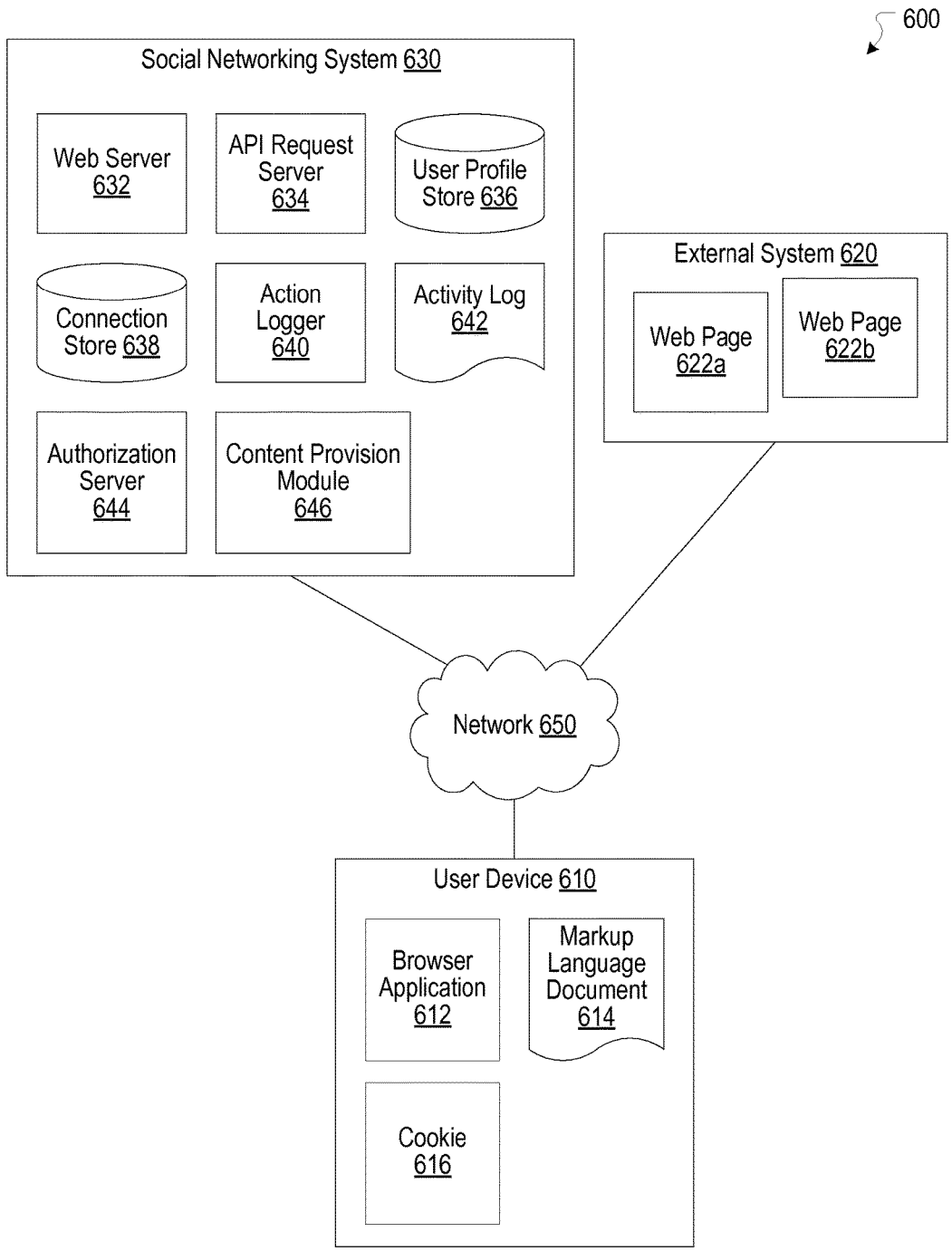
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provision module 646. The content management module 646 can be implemented with the content provision module 102.

Hardware Implementation

Figure 7:
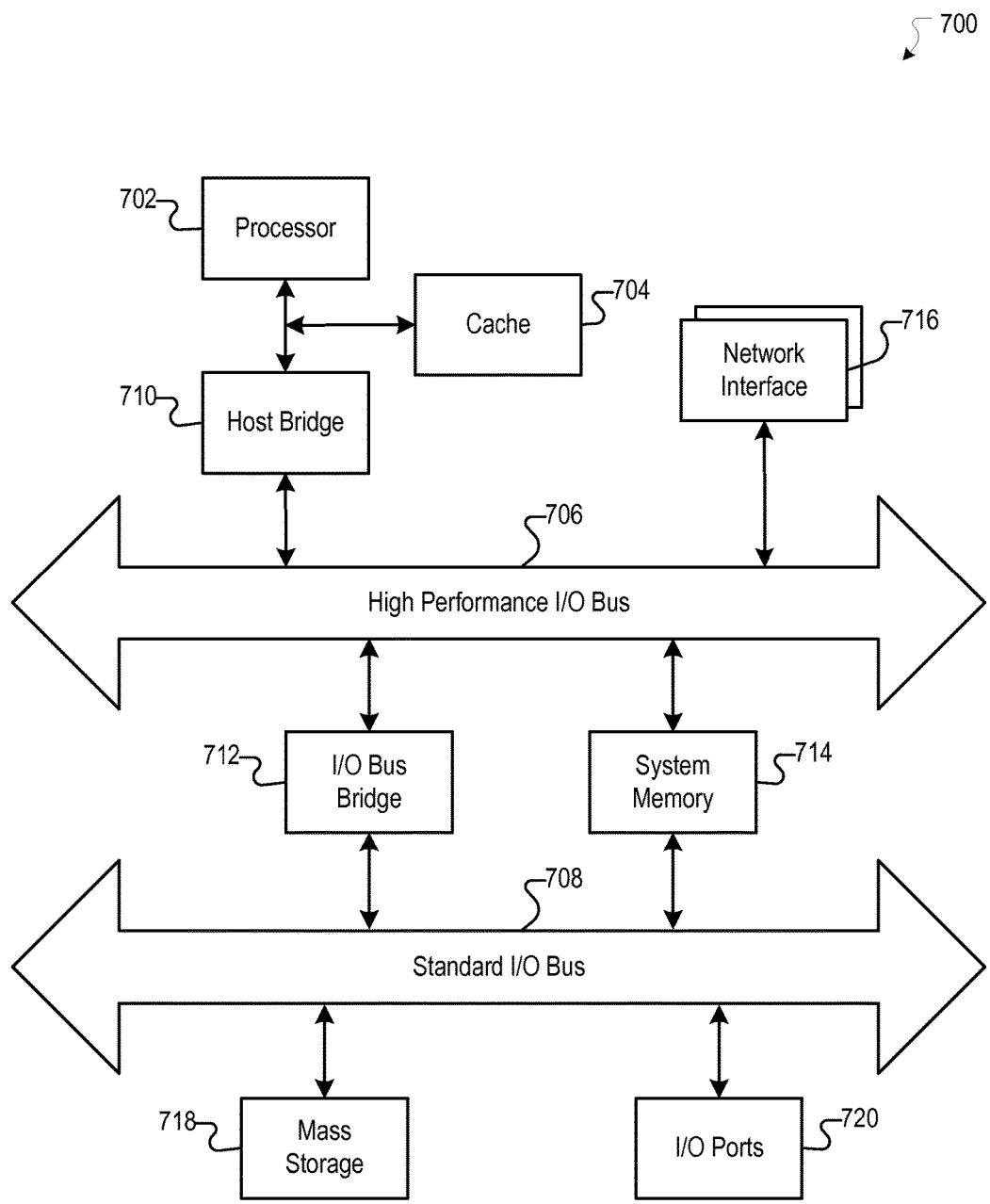
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
determining, by a computing system, a value associated with at least one signal indicative of objectionable material in a content item published in a social networking system, wherein the at least one signal indicative of objectionable material in a content item is based on information in one or more comments published in response to the content item and includes a domain signal relating to a number of links provided by users in comments posted in response to content items published by a domain that published the content item, wherein the links direct to websites that publish content to identify false information as false;
comparing, by the computing system, the value associated with the at least one signal indicative of objectionable material with a threshold value associated with the at least one signal;
determining, by the computing system, a demotion value in response to satisfaction of the threshold value associated with the at least one signal; and
adjusting, by the computing system, a rank value associated with presentation of the content item in a news feed based on the demotion value.

2. The computer-implemented method of claim 1, wherein the at least one signal includes a keyword signal relating to a number of responses, including one or more keywords indicative of objectionable material, to a content item.

3. The computer-implemented method of claim 1, wherein the at least one signal includes a reporting signal relating to a number of users who have reported an objection to the content item.

4. The computer-implemented method of claim 1, wherein the adjusting a rank value comprises:
lowering the rank value.

5. The computer-implemented method of claim 1, wherein the determining a demotion value comprises:
assigning the demotion value in proportion to the value associated with the at least one signal indicative of objectionable material.

6. The computer-implemented method of claim 1, further comprising:
discounting the demotion value for a user when the content item is associated with a domain to which the user is subscribed.

7. The computer-implemented method of claim 1, further comprising:
discounting the demotion value when the content item contains one or more keywords that are indicative of objectionable material.

8. The computer-implemented method of claim 1, wherein the computing system is controlled by the social networking system.

9. A system comprising:
at least one processor; and
a memory storing instructions that, when executed by the at least one processor, cause the system to perform:
determining a value associated with at least one signal indicative of objectionable material in a content item published in a social networking system, wherein the at least one signal indicative of objectionable material in a content item is based on information in one or more comments published in response to the content item and includes a domain signal relating to a number of links provided by users in comments posted in response to content items published by a domain that published the content item, wherein the links direct to websites that publish content to identify false information as false;
comparing the value associated with the at least one signal indicative of objectionable material with a threshold value associated with the at least one signal;
determining a demotion value in response to satisfaction of the threshold value associated with the at least one signal; and
adjusting a rank value associated with presentation of the content item in a news feed based on the demotion value.

10. The system method of claim 9, wherein the at least one signal includes a keyword signal relating to a number of responses, including one or more keywords indicative of objectionable material, to a content item.

11. The system method of claim 10, wherein the at least one signal includes a reporting signal relating to a number of users who have reported an objection to the content item.

12. A non-transitory computer-readable storage medium including instructions that, when executed by at least one processor of a computing system, cause the computing system to perform a method comprising:
determining a value associated with at least one signal indicative of objectionable material in a content item published in a social networking system, wherein the at least one signal indicative of objectionable material in a content item is based on information in one or more comments published in response to the content item and includes a domain signal relating to a number of links provided by users in comments posted in response to content items published by a domain that published the content item, wherein the links direct to websites that publish content to identify false information as false;
comparing the value associated with the at least one signal indicative of objectionable material with a threshold value associated with the at least one signal;
determining a demotion value in response to satisfaction of the threshold value associated with the at least one signal; and
adjusting a rank value associated with presentation of the content item in a news feed based on the demotion value.

13. The non-transitory computer-readable storage medium of claim 12, wherein the at least one signal includes a keyword signal relating to a number of responses, including one or more keywords indicative of objectionable material, to a content item.

14. The non-transitory computer-readable storage medium of claim 13, wherein the at least one signal includes a reporting signal relating to a number of users who have reported an objection to the content item.

* * * * *